United States Patent
Miyazaki (10) Patent No.: US 8,672,011 B2
(45) Date of Patent: Mar. 18, 2014

(54) RUBBER COMPOSITION FOR BEAD APEX AND TIRE HAVING BEAD APEX PREPARED USING SAME

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 606 days.

(21) Appl. No.: 12/226,572

(22) PCT Filed: Jun. 28, 2007

(86) PCT No.: PCT/JP2007/062990
§ 371 (c)(1),
(2), (4) Date: Oct. 22, 2008

(87) PCT Pub. No.: WO2008/007562
PCT Pub. Date: Jan. 17, 2008

(65) Prior Publication Data
US 2009/0151844 A1     Jun. 18, 2009

(30) Foreign Application Priority Data
Jul. 11, 2006  (JP) .................................. 2006-190819

(51) Int. Cl.
*B60C 1/00*   (2006.01)
*B60C 15/00*  (2006.01)
*B60C 15/06*  (2006.01)

(52) U.S. Cl.
USPC .......................... 152/539; 152/541; 152/547

(58) Field of Classification Search
None
See application file for complete search history.

(56) References Cited

U.S. PATENT DOCUMENTS

| | | | | |
|---|---|---|---|---|
| 4,250,939 A | * | 2/1981 | Shibata et al. | 152/541 |
| 4,326,576 A | * | 4/1982 | Mizumoto et al. | 152/541 |
| 5,426,155 A | * | 6/1995 | Hogt et al. | 525/332.6 |

(Continued)

FOREIGN PATENT DOCUMENTS

| | | |
|---|---|---|
| EP | 0751178 A1 | 1/1997 |
| EP | 1 97518 A  | 4/2002 |

(Continued)

OTHER PUBLICATIONS

Extended European Search Report dated Feb. 4, 2011, for European Application No. 07767784.7.

(Continued)

*Primary Examiner* — Justin Fischer
(74) *Attorney, Agent, or Firm* — Birch, Stewart, Kolasch & Birch, LLP (57) ABSTRACT

There is provided a rubber composition for a bead apex which can enhance extrusion processability by optimizing a rate of vulcanization during a vulcanization process, and can improve rigidity, steering stability and a low fuel consumption property, a tire having a bead apex prepared by using the rubber composition for a bead apex and being capable of enhancing steering stability and reducing rolling resistance and a tire for a sports utility vehicle (SUV) having further enhanced durability. The rubber composition for a bead apex comprises a diene rubber, a phenol resin and/or a modified phenol resin, sulfur, hexamethylenetetramine, a vulcanization accelerator, and at least one kind of vulcanization acceleration auxiliary selected from the group consisting of a citraconimide compound, a condensate of alkyl phenol and sulfur chloride, an organic thiosulfate compound and a compound represented by the general formula: $R^1$—S—S-A-S—S—$R^2$.

9 Claims, 4 Drawing Sheets

(56) References Cited

U.S. PATENT DOCUMENTS

| | | | |
|---|---|---|---|
| 5,503,940 A | 4/1996 | Majumdar et al. | |
| 5,872,188 A * | 2/1999 | Datta et al. | 525/150 |
| 6,588,471 B2 * | 7/2003 | Majumdar et al. | 152/209.6 |
| 7,569,639 B2 * | 8/2009 | Choi et al. | 525/189 |
| 2002/0091184 A1 | 7/2002 | Ikeda | |
| 2003/0015272 A1 | 1/2003 | Teratani et al. | |
| 2003/0088023 A1 | 5/2003 | Motofusa et al. | |

FOREIGN PATENT DOCUMENTS

| | | | |
|---|---|---|---|
| EP | 1288022 A1 | | 3/2003 |
| EP | 1075966 | * | 2/2011 |
| JP | 3-28243 A | | 2/1991 |
| JP | 6-262903 | * | 9/1994 |
| JP | 2000-301908 A | | 10/2000 |
| JP | 2001-226528 A | | 8/2001 |
| JP | 2001-288298 A | | 10/2001 |
| JP | 2002-36832 A | | 2/2002 |
| JP | 2002-146110 A | | 5/2002 |
| JP | 2002-327093 A | | 11/2002 |
| JP | 2002-327158 A | | 11/2002 |
| JP | 2003-3015 A | | 1/2003 |
| JP | 2003-82586 A | | 3/2003 |
| JP | 2003-165869 A | | 6/2003 |
| JP | 2004-43664 A | | 2/2004 |
| JP | 2004-238507 A | | 8/2004 |
| JP | 2004-256792 A | | 9/2004 |
| JP | 2005-68240 A | | 3/2005 |
| JP | 2005-187825 A | | 7/2005 |

OTHER PUBLICATIONS

Office Action dated Mar. 29, 2011 for Japanese Application No. 2007-170191.

* cited by examiner

RUBBER COMPOSITION FOR BEAD APEX AND TIRE HAVING BEAD APEX PREPARED USING SAME

TECHNICAL FIELD

The present invention relates to a rubber composition for a bead apex and a tire having a bead apex prepared by using the rubber composition.

BACKGROUND ART

For a rubber composition for a bead apex of a tire, so far emphasis has been placed only on increasing a complex modulus (E*) in order to enhance steering stability.

For increasing the complex modulus (E*), there is, for example, a method of using a carbon black exhibiting a large reinforcing effect in a large amount, however, the method has a problem that tan δ is increased. On the other hand, in order to lower tan δ, for example, there is a method of increasing a content of a vulcanizing agent such as sulfur. However, in the case where a large amount of vulcanizing agent is used, partial scorch of the rubber occurs easily during an extruding process due to an accelerated initial vulcanization rate. The initial vulcanization rate may be somewhat slowed down by compounding a specified amount of a synthetic rubber, and if a retarder PVI is used, processing can be carried out. Even in that case, however, productivity still remains at a low level. In addition, when the retarder PVI is added in an amount exceeding 1.0 part by weight based on 100 parts by weight of a rubber component, blooming thereof occurs during processing of the rubber, and therefore there is a limit in improvement in a vulcanization rate.

JP2002-36832A discloses a rubber composition for a bead apex which comprises specified amounts of a rubber component and a citraconimide compound. However, the rubber composition does not comprise a phenol resin and/or a modified phenol resin, and has a problem that a complex modulus (E*) of not less than 10 MPa cannot be obtained, and steering stability and responsiveness to steering are insufficient.

DISCLOSURE OF INVENTION

An object of the present invention is to provide a rubber composition for a bead apex which can enhance extrusion processability by optimizing a rate of vulcanization during a vulcanization process, and improve rigidity, steering stability and low fuel consumption property, and another object of the present invention is to provide a tire having a bead apex prepared by using the rubber composition for a bead apex and being capable of enhancing steering stability and reducing rolling resistance and a tire for a sports utility vehicle (SUV) having further enhanced durability, in which a ratio of a height of the bead apex to a height of a tire section is higher as compared with a tire for a passenger car.

The present invention relates to a rubber composition for a bead apex comprising 5 to 25 parts by weight of a phenol resin and/or a modified phenol resin, 5.1 to 7.0 parts by weight of sulfur, 0.5 to 2.5 parts by weight of hexamethylenetetramine, 2.0 to 5.0 parts by weight of a sulfenamide vulcanization accelerator and/or a thiazole vulcanization accelerator, and 0.1 to 5 parts by weight of at least one vulcanization acceleration auxiliary selected from the group consisting of a citraconimide compound, a condensate of alkyl phenol and sulfur chloride, an organic thiosulfate compound and a compound represented by the following general formula:

wherein A represents an alkylene group having 2 to 10 carbon atoms, and each of $R^1$ and $R^2$ independently represents a monovalent organic group having a nitrogen atom, based on 100 parts by weight of a diene rubber.

In the above-mentioned rubber composition for a bead apex, the total amount of hexamethylenetetramine and sulfenamide vulcanization accelerator and/or thiazole vulcanization accelerator is preferably 3.5 to 7.5 parts by weight based on 100 parts by weight of the diene rubber.

In the above-mentioned rubber composition for a bead apex, the vulcanization acceleration auxiliary is preferably a citraconimide compound and/or a condensate of alkyl phenol and sulfur chloride represented by the following chemical formula:

wherein n is 0 or an integer of 1 to 10, X is an integer of 2 to 4, R is an alkyl group having 5 to 12 carbon atoms.

In the above-mentioned rubber composition for a bead apex, the citraconimide compound is preferably 1,3-bis(citraconimidemethyl)benzene represented by the following chemical formula.

Also, the present invention relates to a tire having a bead apex prepared by using the above-mentioned rubber composition for a bead apex.

Further, the present invention relates to a tire for a sports utility vehicle having a bead apex prepared by using the above-mentioned rubber composition for a bead apex.

BEST MODE FOR CARRYING OUT THE INVENTION

Figure 1:
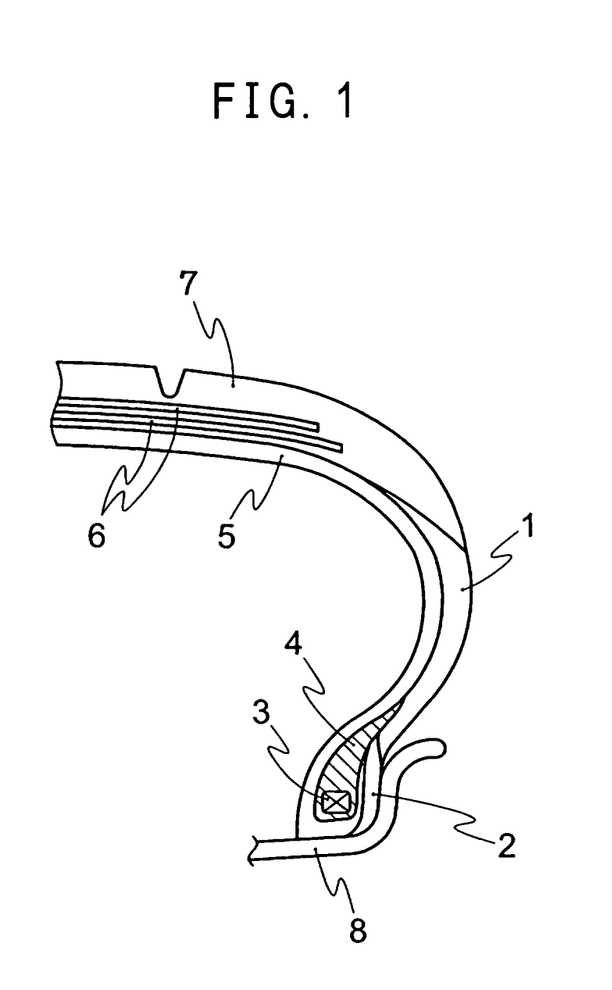
FIG. 1 is a partial cross-sectional view of the tire for a passenger car having the bead apex of the present invention.

FIG. 1 is a partial cross-sectional view of the tire for a passenger car having the bead apex of the present invention.

In the present invention, unless otherwise specified, a tire means a tire for a passenger car and a sports utility vehicle (SUV).

As shown in FIG. 1, the tire of the present invention comprises tire members of a passenger car, for example, a sidewall 1, a tire clinch 2, a bead core 3, a bead apex 4, an inner liner 5, a belt 6 and a tread 7. In FIG. 1, the bead apex 4 is arranged inside the tire clinch 2 and extends outwardly from the bead core 3 in the radial direction. The sidewall 1 as an outer surface of the tire is so arranged as to extend inwardly from the both ends of the tread 7 in the radial direction of the tire. The tire clinch 2 is arranged at inner ends of each sidewall 1. The inner end of the tire in its radial direction is so designed as to be able to contact with a metallic rim 8.

Figure 2:
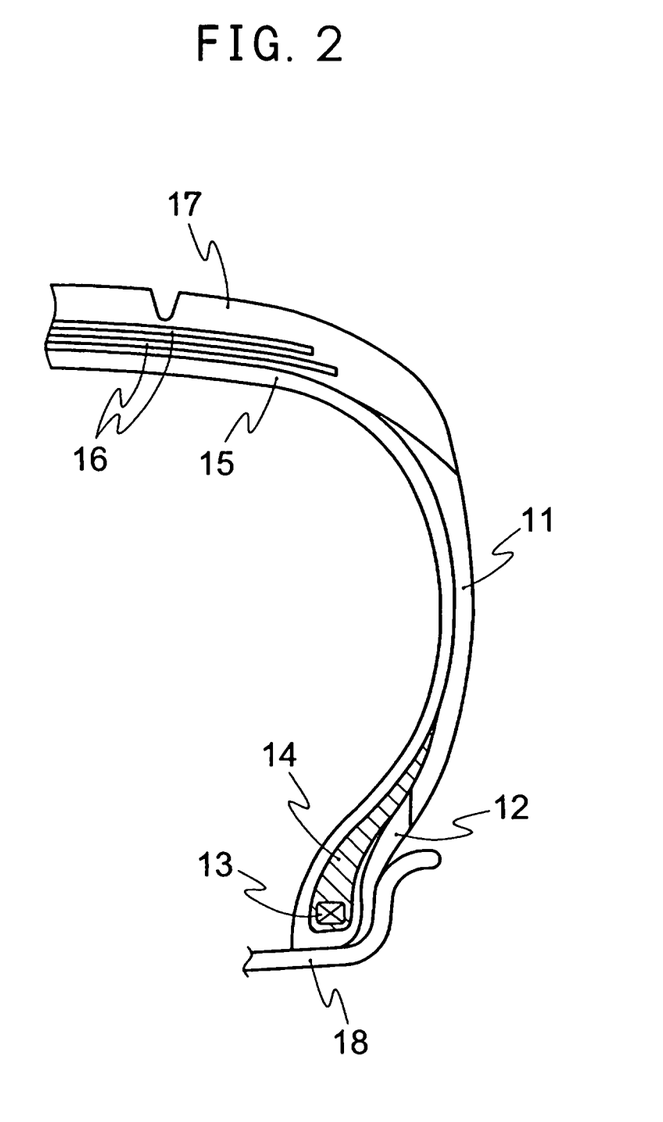
FIG. 2 is a partial cross-sectional view of the tire for a sports utility vehicle (SUV) having the bead apex of the present invention.

FIG. 2 is a partial cross-sectional view of a tire for a sports utility vehicle (SUV) having the bead apex of the present invention.

As shown in FIG. 2, the tire for a sports utility vehicle (SUV) of the present invention is comprised of tire members such as a sidewall 11, a tire clinch 12, a bead core 13, a bead apex 14, an inner liner 15, a belt 16 and a tread 17. A general embodiment of the tire is as explained in FIG. 1. In addition, the inner end of the tire for a sports utility vehicle (SUV) in its radial direction is so designed as to be able to contact with a metallic rim 18.

As shown in FIG. 2, in a tire for a sports utility vehicle (SUV), the sidewall 11 and the bead apex 14 occupy a high volume percentage as compared with other tire members, and therefore characteristics of the sidewall 11 and the bead apex 14 as the tire members have a large effect on characteristics of a molded tire.

In tires for a sports utility vehicle (SUV), shock absorptivity and responsiveness to quick steering for turning during running on a rough road are expected, and on the other hand, characteristics such as satisfactory ride quality on a flat road and smooth ride quality at starting of running (free from flat spot vibration) under cold condition are demanded. Accordingly, the sidewall 11 and the bead apex 14 of the tire for a sports utility vehicle (SUV) are required to have characteristics such as early recovery from permanent set (for example, permanent set under cold condition) (for example, usually being capable of recovering in about 30 minutes at a tire temperature of 70° C.) and responsiveness to quick steering for turning (for example, high rigidity (E*)).

The rubber composition for a bead apex of the present invention comprises a diene rubber, a phenol resin and/or a modified phenol resin, sulfur, a vulcanization accelerator, and a vulcanization acceleration auxiliary.

Examples of the diene rubber are rubber components such as a natural rubber (NR), isoprene rubber (IR), butadiene rubber (BR), styrene-butadiene rubber (SBR), butyl rubber (IIR), halogenated butyl rubber (X-IIR), chloroprene rubber (CR), and acrylonitrile-butadiene rubber (NBR). These diene rubbers are not particularly limited and may be used alone or two or more kinds thereof may be used in combination.

The phenol resin is not particularly limited and examples of the phenol resin are those prepared by reacting phenols with aldehydes such as formaldehyde, acetaldehyde, and furfural in the presence of an acid catalyst or an alkaline catalyst.

Examples of the modified phenol resin are phenol resins modified, for example, with cashew oil, tall oil, linseed oil, various animal and vegetable oils, unsaturated fatty acid, rosin, an alkylbenzene resin, aniline, and melamine.

As the phenol resin or the modified phenol resin, in view of their capability of raising hardness (Hs), the modified phenol resins are preferable, and the phenol resins modified with cashew oil or the phenol resins modified with rosin are preferable.

A content of the phenol resin and/or the modified phenol resin is not less than 5 parts by weight, preferably not less than 7 parts by weight based on 100 parts by weight of the diene rubber. In the case where the content of the phenol resin and/or the modified phenol resin is less than 5 parts by weight, sufficient Hs cannot be obtained. At the same time, the content of the phenol resin and/or the modified phenol resin is not more than 25 parts by weight, preferably not more than 20 parts by weight. In the case where the content of the phenol resin and/or the modified phenol resin is more than 25 parts by weight, strength at break decreases.

With respect to sulfur used in the present invention, insoluble sulfur is preferable because blooming thereof during processing can be inhibited and its dispersibility is superior, and exemplified are Crystex HSOT20 available from Flexsys Kabushiki Kaisha or Sanfel EX available from SANSHIN CHEMICAL INDUSTRY CO., LTD.

While insoluble sulfur represents sulfur being insoluble, for example, in carbon disulfide, rubber-like hydrocarbon or the like, the insoluble sulfur used in the present invention is high molecular weight sulfur containing components being insoluble particularly in carbon disulfide in a ratio of not less than 80%. In addition, the content of the components being insoluble in carbon disulfide may be not less than 90%. Sulfur containing insoluble components in carbon disulfide in a ratio of not less than 60% is not preferable in the present invention because blooming occurs when such sulfur is compounded in an amount of not less than 3 parts by weight based on 100 parts by weight of the diene rubber.

The content of sulfur is not less than 5.1 parts by weight, preferably not less than 5.25 parts by weight based on 100 parts by weight of the diene rubber. In the case where the content of sulfur is less than 5.1 parts by weight, sufficient hardness (Hs) cannot be obtained. At the same time, the content of sulfur is not more than 7.0 parts by weight, preferably not more than 6.5 parts by weight. In the case where the content of sulfur is more than 7.0 parts by weight, blooming thereof occurs during processing, thereby deteriorating stickiness of the rubber, and as a result, during molding of a tire, the bead apex does not adhere to the neighboring inner liner (case) and bubbles (porosity) are generated inside the tire. In addition, even during vulcanization, blooming occurs on the tire surface, which causes uneven distribution of hardness (Hs) of the vulcanized rubber. In the case where the insoluble sulfur is compounded, the content of sulfur as used herein represents a sulfur content excluding oil content in the insoluble sulfur.

The rubber composition contains, as the vulcanization accelerators, hexamethylenetetramine (HMT) and a sulfenamide vulcanization accelerator and/or a thiazole vulcanization accelerator.

A content of hexamethylenetetramine (HMT) is not less than 0.5 part by weight, preferably not less than 1.0 part by weight based on 100 parts by weight of the diene rubber. In the case where the content of HMT is less than 0.5 part by weight, Hs is decreased due to an insufficient amount of generated methylene and insufficient crosslinking reaction of phenol. At the same time, the content of HMT is not more than 2.5 parts by weight, preferably not more than 2.0 parts by weight. In the case where the content of HMT is more than 2.5 parts by weight, crosslinking reaction of phenol is saturated and ammonia as a by-product causes partial scorch of rubber (shortening of scorch time).

In the present invention, partial scorch of the rubber means that when the rubber is kneaded in a Banbury mixer and then subjected to extruding and mold-processing, lumps of partially scorched rubber are partly generated in the extruded rubber or partially scorched rubbers are collected in a cylinder of an extruder and stick thereto. The scorch time represents a period of time (referred to as $T_{10}$ in the present invention) until a stress torque of the rubber is elevated by 10% under a given temperature (for example, 130° C. in the present invention). Between the scorch time and the partial scorch of the rubber, there is such a relation that when the scorch time is short, partial scorch of the rubber occurs easily.

Examples of the sulfenamide vulcanization accelerator are, for example, N-tert-butyl-2-benzothiazolylsulfenamide (e.g., NOCCELER NS available from Ouchi Shinko Chemical Industrial Co., Ltd.), N,N'-dicyclohexyl-2-benzothiazolylsulfenamide (e.g., NOCCELER DZ available from Ouchi Shinko Chemical Industrial Co., Ltd.), N-cyclohexyl-2-benzothiazolylsulfenamide (e.g., NOCCELER CZ available from Ouchi Shinko Chemical Industrial Co., Ltd.), N-oxydiethylene-2-benzothiazolylsulfenameide (e.g., NOCCELER MSA-G available from Ouchi Shinko Chemical Industrial Co., Ltd.), and N,N-diisopropyl-2-benzothiazolylsulfenamide (DPBS). From the viewpoint of stable scorching and superior physical properties of vulcanizate, N-tert-butyl-2-benzothiazolylsulfenamide and N,N'-dicyclohexyl-2-benzothiazolylsulfenamide are preferable.

Examples of the thiazole vulcanization accelerator are, for instance, 2-mercaptobenzothiazole (e.g., NOCCELER M available from Ouchi Shinko Chemical Industrial Co., Ltd.), di-2-benzothiazolyldisulfide (e.g., NOCCELER DM available from Ouchi Shinko Chemical Industrial Co., Ltd.), 2-(4'-morpholinodithio)benzothiazole (e.g., NOCCELER MDB available from Ouchi Shinko Chemical Industrial Co., Ltd.), and 2-(N,N-diethylthiocarbamoylthio)benzothiazole (e.g., NOCCELER 64 available from Ouchi Shinko Chemical Industrial Co., Ltd.). Among them, from the viewpoint of capability of obtaining an appropriate rate of rubber vulcanization, 2-mercaptobenzothiazole is preferable.

A content of the sulfenamide vulcanization accelerator and/or the thiazole vulcanization accelerator is not less than 2.0 parts by weight, preferably not less than 2.5 parts by weight based on 100 parts by weight of the diene rubber. In the case where the content of the sulfenamide vulcanization accelerator and/or the thiazole vulcanization accelerator is less than 2.0 parts by weight, sufficient Hs cannot be obtained. At the same time, the content of the sulfenamide vulcanization accelerator and/or the thiazole vulcanization accelerator is not more than 5.0 parts by weight, preferably not more than 4.5 parts by weight. In the case where the content of the sulfenamide vulcanization accelerator and/or the thiazole vulcanization accelerator is more than 5.0 parts by weight, scorch time is excessively shortened and partial scorch of the rubber is caused.

The total content of hexamethylenetetramine (HMT) and sulfenamide vulcanization accelerator and/or thiazole vulcanization accelerator is preferably not less than 3.5 parts by weight, more preferably not less than 4.0 parts by weight, further preferably not less than 5.0 parts by weight based on 100 parts by weight of the diene rubber so that a necessary hardness (Hs) can be exhibited. In addition, the total content of hexamethylenetetramine (HMT) and sulfenamide vulcanization accelerator and/or thiazole vulcanization accelerator is preferably not more than 7.5 parts by weight, more preferably not more than 7.0 parts by weight based on 100 parts by weight of the diene rubber so that the scorch time can be a processing limit (namely, the scorch time can be made longer).

There are vulcanization accelerators other than HMT, the sulfenamide vulcanization accelerator and the thiazole vulcanization accelerator, for example, guanidine vulcanization accelerators such as diphenylguanidine, hexamethoxymethylolmelamine (HMMM), and hexamethoxymethylol pentamethyl ether (HMMPME). However, HMT and the sulfenamide vulcanization accelerator and/or the thiazole vulcanization accelerator are most suitable since both of the crosslinking of a phenol resin and sulfur vulcanization can be carried out and an adequate processability (adequate scorch time) can be obtained.

In the present invention, there is contained, as the vulcanization acceleration auxiliary, at least one kind of compound selected from the group consisting of a citraconimide compound, a condensate of alkyl phenol and sulfur chloride, an organic thiosulfate compound, and a compound represented by the following general formula:

wherein A represents an alkylene group having 2 to 10 carbon atoms, and each of $R^1$ and $R^2$ independently represents a monovalent organic group having a nitrogen atom.

For the reason that the scorch time is not affected, it is preferable to use the citraconimide compound as the vulcanization acceleration auxiliary.

Preferable as the citraconimide compound are bis-citraconimides because of their favorable properties such as excellent thermal stability and dispersibility in a rubber. More specifically, examples of the citraconimide compound are 1,2-bis(citraconimidemethyl)benzene, 1,3-bis(citraconimidemethyl)benzene, 1,4-bis(citraconimidemethyl)benzene, 1,6-bis(citraconimidemethyl)benzene, 2,3-bis(citraconimidemethyl)toluene, 2,4-bis(citraconimidemethyl)toluene, 2,5-bis(citraconimidemethyl)toluene, 2,6-bis(citraconimidemethyl)toluene, 1,2-bis(citraconimideethyl)benzene, 1,3-bis(citraconimideethyl)benzene, 1,4-bis(citraconimideethyl)benzene, 1,6-bis(citraconimideethyl)benzene, 2,3-bis(citraconimideethyl) toluene, 2,4-bis(citraconimideethyl) toluene, 2,5-bis(citraconimideethyl) toluene, 2,6-bis(citraconimideethyl)toluene and the like. Among them, 1,3-bis(citraconimidemethyl)benzene is preferable because its thermal stability is especially stable, its dispersibility in the rubber is particularly excellent and a rubber composition having a high hardness (Hs) can be obtained (control of reversion).

1,3-bis(citraconimidemethyl)benzene is represented by the following chemical formula:

For the reason that a rubber composition having a higher hardness (Hs) can be obtained, it is preferable to use a condensate of alkyl phenol and sulfur chloride as the vulcanization acceleration auxiliary.

The condensate of alkyl phenol and sulfur chloride is represented by the following chemical formula:

wherein n is 0 or an integer of 1 to 10, X is an integer of 2 to 4, R is an alkyl group having 5 to 12 carbon atoms.

For the reason that dispersibility of the condensate of alkyl phenol and sulfur chloride in the rubber is satisfactory, n is preferably 0 or an integer of 1 to 10, more preferably an integer of 1 to 9.

For the reason that a high hardness can be exhibited efficiently (control of reversion), preferably X is an integer of 2 to 4, more preferably X is 2. In the case where X is more than 4, the condensate tends to be thermally unstable. In the case where X is 1, the sulfur content (weight of sulfur) in the condensate of alkyl phenol and sulfur chloride is small.

For the reason that dispersibility of the condensate of alkyl phenol and sulfur chloride in the rubber is satisfactory, R is preferably an alkyl group having 5 to 12 carbon atoms, more preferably an alkyl group having 6 to 9 carbon atoms.

Example of the condensate of alkyl phenol and sulfur chloride is TACKROL V200 being available from TAOKA CHEMICAL CO., LTD., having a sulfur content of 24% by weight and represented by the following formula:

in which n is 0 to 10, X is 2 and R is an alkyl group of $C_8H_{17}$.

For the reason that a high hardness (Hs) can be obtained (control of reversion), it is preferable to use the organic thiosulfate compound represented by the following formula as the vulcanization acceleration auxiliary.

The organic thiosulfate compound is represented by the following general formula:

$$MO_3S—S—(CH_2)_m—S—SO_3M$$

wherein m is an integer of 3 to 10, and M represents lithium, potassium, sodium, magnesium, calcium, barium, zinc, nickel, or cobalt, and the compound is hydrophilic and may contain crystal water.

m is preferably an integer of 3 to 10, more preferably an integer of 3 to 6. In the case where m is 2 or less, there is a tendency that adequate thermal fatigue resistance cannot be obtained. On the other hand, in the case where m is 11 or more, improvement in thermal fatigue resistance tends to be relatively small though a molecular weight increases.

M is preferably lithium, potassium, sodium, magnesium, calcium, barium, zinc, nickel, or cobalt, and potassium or sodium is more preferable.

In addition, the compound may contain crystal water in its molecule.

Examples of the organic thiosulfate compound which can be used in the present invention are sodium salt-monohydrate, sodium salt-dihydrate and the like from the viewpoint that hydrates are stable at normal temperature under normal pressure. For economical reason that sodium chloride is cheap, a derivative of sodium thiosulfate, e.g., 1,6-hexamethylene sodium dithiosulfate dihydrate is preferable.

The 1,6-hexamethylene sodium dithiosulfate dihydrate is represented by the following chemical formula:

Besides the aforementioned three vulcanization acceleration auxiliaries, it is preferable to use a compound represented by the following formula as the vulcanization acceleration auxiliary usable in the present invention:

$$R^1—S—S-A-S—S—R^2$$

wherein A represents an alkylene group having 2 to 10 carbon atoms, and each of $R^1$ and $R^2$ independently represents a monovalent organic group having a nitrogen atom, for the reason that the auxiliary can be dispersed satisfactorily in the rubber and sulfur can be introduced, and hybrid crosslinking can be formed by introducing the auxiliary in the midst of the -Sx- crosslinking of the condensate of alkyl phenol and sulfur chloride.

A is preferably an alkylene group. The alkylene group may be a linear, branched, or cyclic one and any one can be used without particular limitation, and the linear alkylene group is preferable.

The number of carbon atoms of A is preferably 2 to 10, more preferably 4 to 8. In the case where the number of carbon atoms of A is 1 or less, there is a tendency that thermal stability is poor and the merits of S—S bonds cannot be obtained. On the contrary, in the case where the number of carbon atoms of A is 11 or more, a distance between the polymers bonded through the vulcanization acceleration auxiliary will become longer than crosslinked chains of $S_8$ and there is a tendency that a substitution of -Sx- with the vulcanization acceleration auxiliary is difficult, crosslinking does not proceed and an effect of adding the vulcanization acceleration auxiliary cannot be obtained. Here x of -Sx- means an integer of not more than 8 (namely, 1 to 8).

Examples of the alkylene group (A) satisfying the above conditions are an ethylene group, a trimethylene group, a tetramethylene group, a pentamethylene group, a hexamethylene group, a heptamethylene group, an octamethylene group, and a decamethylene group. Among them, the hexamethylene group is preferable as the alkylene group (A) because of smooth substitution for Sx (x=2 to 8) in the sulfur vulcanization between polymer/vulcanization acceleration auxiliary/polymer and superior thermal stability.

It is preferable that each of $R^1$ and $R^2$ is independently a monovalent organic group having a nitrogen atom, more preferably one having at least one aromatic ring, further preferably one having a bond represented by the formula =N—C(=S)— formed by bonding a carbon atom to a dithio group.

Each of $R^1$ and $R^2$ may be the same or different, and because of easy preparation, $R^1$ and $R^2$ are preferably the same.

Examples of the compound satisfying the above requirements are, for instance, 1,2-bis(N,N'-dibenzylthiocarbamoyldithio)ethane, 1,3-bis(N,N'-dibenzylthiocarbamoyldithio)propane, 1,4-bis(N,N'-dibenzylthiocarbamoyldithio)butane, 1,5-bis(N,N'-dibenzylthiocarbamoyldithio)pentane, 1,6-bis(N,N'- dibenzylthiocarbamoyldithio)hexane, 1,7-bis(N,N'-dibenzylthiocarbamoyldithio)heptane, 1,8-bis(N,N'-dibenzylthiocarbamoyldithio)octane, 1,9-bis(N,N'-dibenzylthiocarbamoyldithio)nonane, and 1,10-bis(N,N'-dibenzylthiocarbamoyldithio)decane. Among these, 1,6-bis(N,N'-dibenzylthiocarbamoyldithio)hexane is preferable because of its superior thermal stability and excellent dispersibility in the rubber.

Example of a commercially available compound represented by the formula:

wherein A represents an alkylene group having 2 to 10 carbon atoms, and each of $R^1$ and $R^2$ independently represents a monovalent organic group having a nitrogen atom, is, for instance, VULCUREN TRIAL PRODUCT KA9188 (1,6-bis(N,N'-DIBENZYLTHIOCARBAMOYLDITHIO)HEXANE) available from BAYER.

Among the aforementioned four kinds of vulcanization acceleration auxiliaries, 1,3-bis(citraconimidemethyl)benzene is preferable because of its favorable thermal stability since no sulfur is contained in its molecular structure and for the reason that sulfur is not released during crosslinking and the initial vulcanization rate is not excessively high. In addition, a condensate of alkyl phenol and sulfur chloride is preferable for the reasons that dispersion thereof in the rubber composition is satisfactory by effects of a benzene ring and $C_8H_{17}$ branched chain (alkyl group), sulfur can be released and an ultra high hardness (Hs) can be obtained.

A content of the vulcanization acceleration auxiliary is not less than 0.1 part by weight, preferably not less than 0.25 part by weight based on 100 parts by weight of the diene rubber. In the case where the content of the vulcanization acceleration auxiliary is less than 0.1 part by weight, sufficient hardness cannot be obtained. At the same time, the content of the vulcanization acceleration auxiliary is not more than 5 parts by weight, preferably not more than 4 parts by weight. In the case where the content of the vulcanization acceleration auxiliary is more than 5 parts by weight, boosting of the vulcanization accelerator occurs, resulting in accelerating the crosslinking of the rubber, making a crosslinked network dense, and saturating an effect of increasing hardness. As a result, hardness is not increased and only the scorch time becomes short.

In the case where a citraconimide compound, an organic thiosulfate compound, or a compound represented by the formula $R^1$—S—S-A-S—S—$R^2$ is contained as the vulcanization acceleration auxiliary, the content thereof is preferably 0.5 to 5.0 parts by weight based on 100 parts by weight of the diene rubber. In the case where a condensate of alkyl phenol and sulfur chloride is contained as the vulcanization acceleration auxiliary, its content is preferably 0.5 to 3.0 parts by weight based on 100 parts by weight of the diene rubber because a scorch time tends to be shortened.

Examples of the vulcanization acceleration auxiliary other than the citraconimide compound, the condensate of alkyl phenol and sulfur chloride, the organic thiosulfate compound, and the compound represented by the formula $R^1$—S—S-A-S—S—$R^2$ are, for instance, tetrabenzylthiuramdisulfide (TBZTD) available from Flexsys Kabushiki Kaisha and the like. However, TBZTD and the like accelerate the rate of vulcanization more than enough due to a very high sulfur content thereof, and therefore it is preferable not to compound them.

Also, an antioxidant, stearic acid, and zinc oxide which are generally used in the rubber industry may be optionally compounded as the vulcanization acceleration auxiliaries as needed.

In the present invention, by compounding specified amounts of the diene rubber, the phenol resin and/or the modified phenol resin, sulfur, the specific vulcanization accelerator, and the specific vulcanization acceleration auxiliary, extrusion processability can be enhanced by optimizing a rate of vulcanization during the vulcanization process, and also rigidity and a low fuel consumption property can be enhanced.

Besides the aforementioned diene rubber, phenol resin and/or modified phenol resin, sulfur, vulcanization accelerator, and vulcanization acceleration auxiliary, the rubber composition for a bead apex of the present invention may comprise compounding agents that have been utilized generally in the rubber industry, for example, fillers such as a carbon black, silica, calcium carbonate, coal ash, clay and mica, a silane coupling agent, and N-cyclohexylthiophthalamide (CTP) according to necessity.

The complex modulus (E*) of the rubber composition for a bead apex of the present invention measured at 70° C. under the conditions of an initial strain of 10% and a dynamic strain of 2% is preferably not less than 15 MPa, more preferably not less than 20 MPa. In the case where the complex modulus (E*) of the rubber composition for a bead apex of the present invention is less than 15 MPa, neither sufficient steering stability nor good responsiveness to steering tends to be obtained. At the same time, the complex modulus (E*) of the rubber composition for a bead apex of the present invention is preferably not more than 60 MPa, more preferably not more than 55 MPa. In the case where the complex modulus (E*) of the rubber composition for a bead apex of the present invention is more than 60 MPa, there is a tendency that the elongation at break ($E_B$) is decreased and breakage occurs as a result of a collision with curbstones or deformation in mounting the tire to a rim.

When explaining by means of FIG. 1 which is a partial cross-sectional view of the tire for a passenger car having a bead apex of the present invention, the bead apex 4 is a rubber portion arranged inside the tire clinch 2 and extending outwardly from the bead core 3 in the radial direction, and functions to exhibit responsiveness to steering (steering stability) since a torque is transmitted in the order of the rim 8, the tire clinch 2, the bead apex 4 and the inner liner 5.

The rubber composition for a bead apex of the present invention is a rubber composition prepared in consideration of its use for a bead apex among tire members because its viscoelasticity (rigidity) (E*) is high and its rolling resistance (tan δ) is low.

The tire (tire for a passenger car and tire for sports utility vehicle (SUV)) of the present invention is prepared by a usual method using the rubber composition for a bead apex of the present invention. More specifically, the rubber composition of the present invention prepared by compounding the aforementioned compounding agents according to necessity is extruded and processed into a shape of a bead apex of a tire in an unvulcanized state, and then an unvulcanized tire is molded in a usual manner on a tire molding machine. Then, the unvulcanized tire is subjected to heating and pressing in a vulcanizer to obtain a tire.

Figure 3:
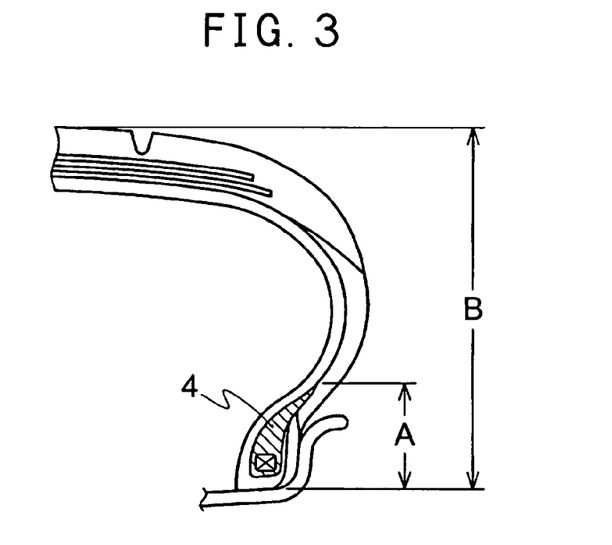
FIG. 3 is a diagrammatic view showing a ratio of a height of the bead apex of the present invention to a height of a section in a tire for a passenger car.

FIG. 3 is a diagrammatic view showing a ratio of a height of the bead apex of the present invention to a height of a section of a tire for a passenger car. FIG. 3 diagrammatically shows the height A of the bead apex 4 of the present invention to the height B of the section of a tire for a passenger car.

Figure 4:
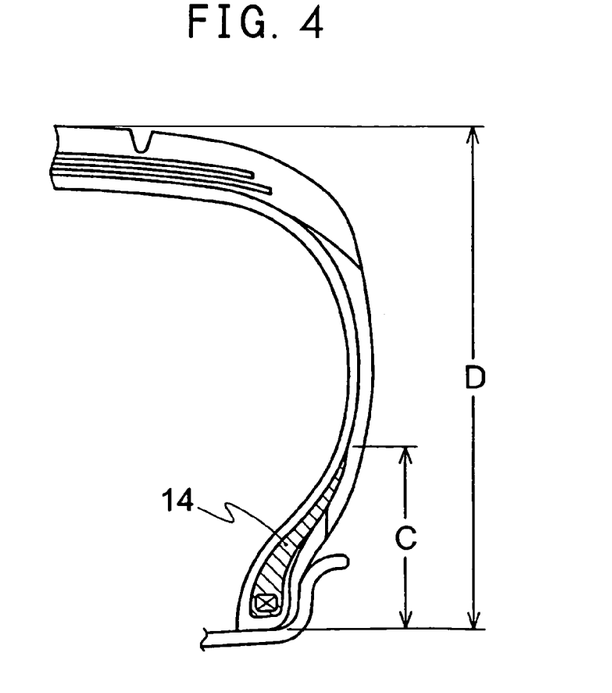
FIG. 4 is a diagrammatic view showing a ratio of a height of a bead apex of the present invention to a height of a section in a tire for a sports utility vehicle (SUV).

FIG. 4 is a diagrammatic view showing a ratio of a height of the bead apex of the present invention to a height of a section of a tire for a sports utility vehicle (SUV). FIG. 4 diagrammatically shows the height C of the bead apex 14 of the present invention to the height D of the section of a tire for a sports utility vehicle.

Tires for a sports utility vehicle (SUV) has properties such that when parking in a cold district, permanent set is easily accumulated and flat spot vibration is easily caused, and therefore responsiveness to quick steering is demanded. Accordingly it is preferable that the bead apex which is prepared by using the rubber composition for a bead apex of the present invention and has enhanced rigidity, durability and steering stability is used for tires for a sports utility vehicle (SUV) in which a ratio of a height of the bead apex to a height of a section is high and the bead apex is a relatively important member among tire members.

In the present invention, a ratio of a height of the bead apex to a height of a section is a value of A/B in FIG. 3 in the case of a tire for a passenger car, and a value of C/D in FIG. 4 in the case of a tire for a sports utility vehicle (SUV).

Figure 5:
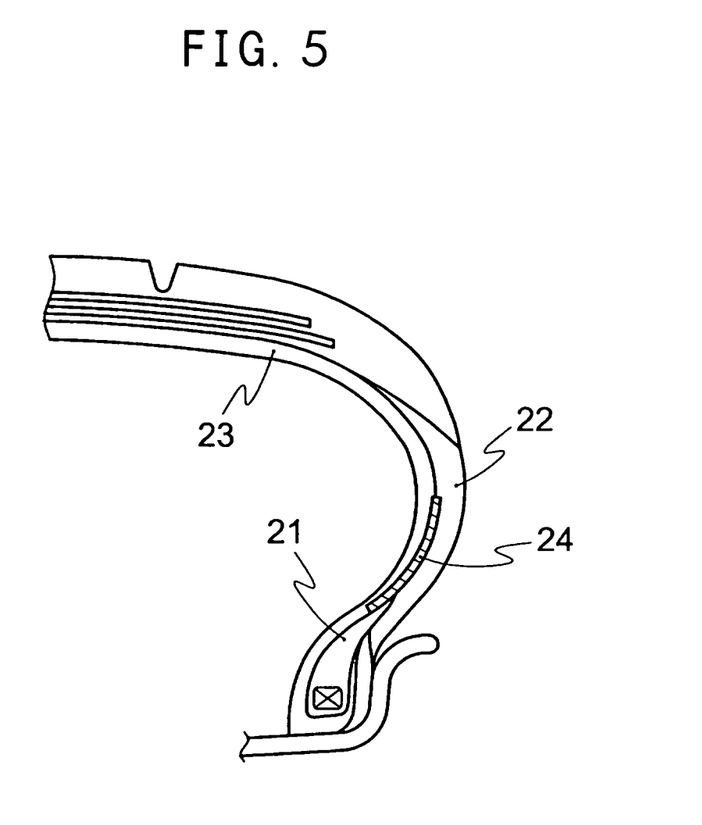
FIG. 5 is a partial cross-sectional view of a tire for a passenger car having a strip apex prepared by using the rubber composition for a bead apex of the present invention.

FIG. 5 is a partial cross-sectional view of a tire for a passenger car in which the rubber composition for a bead apex of the present invention is used for a strip apex of a tire for a passenger car.

The rubber composition for a bead apex of the present invention is excellent in rigidity, and therefore as shown in FIG. 5, can be used preferably as a rubber composition for a strip apex 24 (for example, 1 mm thick sheet) which is provided at the end of a bead apex 21 and contacts with a sidewall 22 and an inner liner 23.

In addition, the rubber composition for a bead apex of the present invention can be used preferably as a rubber composition for an inner liner for a race tire.

EXAMPLES

Hereinafter, the present invention will be explained in detail based on Examples, but it should be understood that the present invention is not limited thereto.

Various chemicals used in Examples and Comparative Examples will be collectively explained hereinafter.

Natural rubber (NR): RSS#3
Carbon black: SHOWBLACK N550 available from CABOT JAPAN Kabushiki Kaisha
Silica: 115GR available from Rhodia Japan, Ltd.
Silane coupling agent: Si69 (bis(3-triethoxysilylpropyl) tetrasulfide) available from Degussa GmbH
Modified phenol resin: PR12686 (phenol resin modified with cashew oil) available from Sumitomo Bakelite Co., Ltd.
Antioxidant: NOCRAC 6C (N-1,3-dimethylbutyl-N'-phenyl-p-phenylenediamine) available from Ouchi Shinko Chemical Industrial Co., Ltd.
Zinc oxide: available from Mitsui Mining & Smelting Co., Ltd.
Stearic acid: available from NOF Corporation
Sulfur: Crystex HSOT20 (insoluble sulfur containing 80% by weight of sulfur and 20% by weight of oil, and in sulfur components, an insoluble sulfur content is not less than 90% and a soluble sulfur content is not more than 10%) available from Flexsys Kabushiki Kaisha
Vulcanization acceleration auxiliary (1): PERKALINK900 (1,3-bis(citraconimidemethyl)benzene) available from Flexsys Kabushiki Kaisha and represented by the following formula:

Vulcanization acceleration auxiliary (2): TACKROL V200 (a condensate of alkyl phenol and sulfur chloride, n: 0 to 10, X: 2, R: an alkyl group of $C_8H_{17}$, sulfur content: 24% by weight) available from Taoka Chemical Co., Ltd. and represented by the following formula:

Vulcanization acceleration auxiliary (3): 1,6-hexamethylene sodium dithiosulfate dihydrate available from Flexsys Kabushiki Kaisha and represented by the following formula:

Vulcanization acceleration auxiliary (4): VULCUREN TRIAL PRODUCT KA9188 (1,6-bis(N,N'-dibenzylthiocarbamoyldithio)hexane) available from BAYER.
Vulcanization accelerator (1): NOCCELER H (hexamethylenetetramine, HMT) available from Ouchi Shinko Chemical Industrial Co., Ltd.
Vulcanization accelerator (2): NOCCELER NS (N-tert-butyl-2-benzothiazolylsulfenamide) available from Ouchi Shinko Chemical Industrial Co., Ltd.
N-cyclohexylthiophthalamide (CTP): CTP available from Ouchi Shinko Chemical Industrial Co., Ltd.

Examples 1 to 6 and Comparative Examples 1 to 7

In accordance with the compounding prescriptions shown in Table 1, chemicals other than sulfur, the vulcanization acceleration auxiliaries (1) to (4), the vulcanization accelerators (1) and (2), and N-cyclohexylthiophthalamide (CTP) were kneaded in a Banbury mixer to prepare kneaded products. Then, sulfur, the vulcanization acceleration auxiliaries (1) to (4), the vulcanization accelerators (1) and (2), and CTP were added to the obtained kneaded products and were kneaded on an open roll to prepare unvulcanized rubber compositions. Each of the obtained unvulcanized rubber compositions was press-vulcanized under the condition of 170° C. for 12 minutes to prepare vulcanized rubber compositions of Examples 1 to 6 and Comparative Examples 1 to 7.

As shown in Table 1, 2.5 parts by weight of the vulcanization acceleration auxiliary (1) was contained in Example 1, 1.6 parts by weight of the vulcanization acceleration auxiliary (2) was contained in Example 2, 2.5 parts by weight of the vulcanization acceleration auxiliary (3) was contained in Example 3, 1.25 parts by weight of the vulcanization acceleration auxiliary (1) and 0.8 part by weight of the vulcanization acceleration auxiliary (2) were contained in Example 4, 2.5 parts by weight of the vulcanization acceleration auxiliary (4) was contained in Example 5, and 2.5 parts by weight of the vulcanization acceleration auxiliary (1) was contained in Example 6 under the condition that neither silica nor silane coupling agent was compounded. These contents were so adjusted that the same level of crosslinking density could be obtained. Here the same level of crosslinking density referred to in the present invention means that crosslinking densities of the obtained rubber compositions are the same and when the crosslinking densities are the same, properties such as a swelling degree (swell), hardness (Hs) and complex modulus (E*) are also nearly the same.

(Initial Vulcanization Rate)

An initial vulcanization rate is measured according to JIS K 6300 (Unvulcanized rubber—Physical properties—Part. 1: Method for measuring viscosity and scorch time using a Mooney viscometer).

In "Mooney scorch test" according to JIS K 6300, using a L-shaped rotor, a period of time (Mooney scorch time, referred to as $t_{10}$) required for elevating a Mooney viscosity of the above-mentioned unvulcanized rubber composition (vulcanizable rubber composition) to 10M (M represents a Mooney viscosity) is determined at a measuring temperature of 130° C. For measuring the Mooney scorch time (minute), a M-time curve (unit: minute) showing a relation between the Mooney viscosity and the time is prepared.

It is necessary that the Mooney scorch time is not less than 7.0 minutes for the reasons that it is necessary to charge the rubber sheet of normal temperature in an extruder, heat it to increase flowability and then discharge it in a desired shape without causing the partial scorch, and also for the reason that the rubber temperature at discharging reaches around 130° C., and a longer residence time in the rubber extruder can be secured. When the Mooney scorch time is 7.0 minutes or more, unvulcanized rubber compositions are processable. In addition, it is necessary that the Mooney scorch time (minute) is not more than 30 minutes for the reason that insufficient vulcanization does not occur when vulcanizing in a mold after molding of an unvulcanized rubber.

(Viscoelasticity Test)

Using a viscoelasticity spectrometer VES (manufactured by Iwamoto Seisakusyo Kabushiki Kaisha), a complex modulus (E*) and a loss tangent (tan δ) of the respective vulcanized rubber compositions are measured at 70° C. under the conditions of an initial strain of 10% and a dynamic strain of 2%. The larger the E* is, the higher the rigidity is and thus steering stability is superior. The smaller the tan δ is, the more preferable the low fuel consumption property is.

(Steering Stability)

The aforementioned unvulcanized rubber compositions are formed into a shape of a bead apex, and then press-vulcanized together with other tire members under the condition of 170° C. for 12 minutes to produce tires for sports utility vehicles (tires for SUVs, tire size: P265/65R17 110S).

In addition, tires for passenger cars (tire size: 195/65R15 91S) are produced by forming the aforementioned unvulcanized rubber compositions into a shape of a bead apex, and then press-vulcanizing together with other tire members under the condition of 170° C. for 12 minutes.

The tires for SUV thus produced are mounted on a sports utility vehicle (SUV), and the tires for a passenger car thus produced are mounted on a passenger car (NOAH produced by TOYOTA MOTOR CORPORATION), and the SUV and the passenger car are run on a test course to perform sensory tests to evaluate steering stability and responsiveness to steering. Steering stability and responsiveness to steering are evaluated on the basis of 6 points at maximum based on the steering stability and responsiveness to steering of Comparative Example 1 of 5. The larger the point is, the more excellent the steering stability and responsiveness to steering are. The tires of the point $5^+$ represent that their steering stability and responsiveness to steering are better than the tires of the point 5 but inferior to the tires of the point 6.

(Rolling Resistance)

Using a rolling resistance tester manufactured by Kobe Steel, Ltd., the tires for SUV are run under the conditions of a load of 30 N, a tire inner pressure of 200 kPa and a speed of 80 km/hr to measure rolling resistances. The rate (%) of change in rolling resistance of each composition is expressed by an index based on the rolling resistance of Comparative Example 1 (±0) by calculating according to the following equation. The smaller the rate of change in rolling resistance is, the more the rolling resistance is decreased and thus it is more preferable. Specifically, a negative value is preferable.

(Rate of change in rolling resistance)=(Rolling resistance of each of the compositions−Rolling resistance of Comparative Example 1)/(Rolling resistance of Comparative Example 1)×100

(Indoor Load Durability Test on Drum)

A tire for SUV is run on a drum at a speed of 20 km/h by applying, to the tire, a load of 230% of a maximum load (maximum inner pressure condition) as defined in JIS, and a running distance until swelling at a bead part is generated is measured. The running distance of Comparative Example 1 is expressed by an index of 100, and each of the running distances of the other rubber compositions is represented by an index (indoor load durability index). The larger the value is, the superior the durability is.

(Indoor load durability index)=(Running distance of each compounding)÷(Running distance of Comparative Example 1)×100

Evaluation results of the aforementioned tests are shown in Tables 1 and 2.

TABLE 1

|  | Example | | | | | |
|---|---|---|---|---|---|---|
|  | 1 | 2 | 3 | 4 | 5 | 6 |
| Amounts (part by weight) | | | | | | |
| NR | 100 | 100 | 100 | 100 | 100 | 100 |
| Carbon black | 50 | 50 | 50 | 50 | 50 | 55 |
| Silica | 10 | 10 | 10 | 10 | 10 | — |
| Silane coupling agent | 1.0 | 1.0 | 1.0 | 1.0 | 1.0 | — |
| Modified phenol resin | 18 | 18 | 18 | 18 | 18 | 18 |
| Antioxidant | 1.5 | 1.5 | 1.5 | 1.5 | 1.5 | 1.5 |
| Zinc oxide | 5 | 5 | 5 | 5 | 5 | 5 |
| Stearic acid | 3 | 3 | 3 | 3 | 3 | 3 |
| Insoluble sulfur (containing 20% of oil content) | 7.5 | 7.5 | 7.5 | 7.5 | 7.5 | 7.5 |
| Vulcanization acceleration auxiliary (1) | 2.5 | — | — | 1.25 | — | 2.5 |
| Vulcanization acceleration auxiliary (2) | — | 1.6 | — | 0.8 | — | — |
| Vulcanization acceleration auxiliary (3) | — | — | 2.5 | — | — | — |
| Vulcanization acceleration auxiliary (4) | — | — | — | — | 2.5 | — |
| Vulcanization accelerator (1) | 1.8 | 1.8 | 1.8 | 1.8 | 1.8 | 1.8 |

TABLE 1-continued

|  | Example | | | | | |
|---|---|---|---|---|---|---|
|  | 1 | 2 | 3 | 4 | 5 | 6 |
| Vulcanization accelerator (2) | 3.7 | 3.7 | 3.7 | 3.7 | 3.7 | 3.7 |
| CTP | 0.6 | 0.6 | 0.6 | 0.6 | 0.6 | 0.6 |
| Evaluation Results | | | | | | |
| Scorch time (minute) | 8.0 | 7.1 | 7.3 | 7.5 | 7.2 | 7.5 |
| Viscoelasticity test | | | | | | |
| E* (MPa) | 50 | 51 | 50 | 50 | 50 | 52 |
| tan δ | 0.11 | 0.105 | 0.115 | 0.113 | 0.116 | 0.11 |
| Steering stability | | | | | | |
| Tire for SUV | 6 | 6 | 5+ | 5+ | 5+ | 6 |
| Tire for passenger car | 5+ | 5+ | 5 | 5 | 5 | 5 |
| Rate of change in rolling resistance (%) | −2.0 | −2.2 | −1.8 | −1.8 | −1.7 | −2.0 |
| Indoor load durability index | 125 | 130 | 115 | 115 | 115 | 120 |

TABLE 2

|  | Comparative Example | | | | | | |
|---|---|---|---|---|---|---|---|
|  | 1 | 2 | 3 | 4 | 5 | 6 | 7 |
| Amounts (part by weight) | | | | | | | |
| NR | 100 | 100 | 100 | 100 | 100 | 100 | 100 |
| Carbon black | 50 | 50 | 50 | 50 | 50 | 50 | 50 |
| Silica | 10 | 10 | 10 | 10 | 10 | 10 | 10 |
| Silane coupling agent | 1.0 | 1.0 | 1.0 | 1.0 | 1.0 | 1.0 | 1.0 |
| Modified phenol resin | 18 | 18 | 22 | 18 | 18 | 18 | 18 |
| Antioxidant | 1.5 | 1.5 | 1.5 | 1.5 | 1.5 | 1.5 | 1.5 |
| Zinc oxide | 5 | 5 | 5 | 5 | 5 | 5 | 5 |
| Stearic acid | 3 | 3 | 3 | 3 | 3 | 3 | 3 |
| Insoluble sulfur (containing 20% of oil content) | 7.5 | 9.0 | 7.5 | 7.5 | 6.25 | 6.25 | 9.0 |
| Vulcanization acceleration auxiliary (1) | — | — | — | — | 2.5 | — | 2.5 |
| Vulcanization acceleration auxiliary (2) | — | — | — | 1.6 | — | 1.6 | — |
| Vulcanization acceleration auxiliary (3) | — | — | — | — | — | — | — |
| Vulcanization acceleration auxiliary (4) | — | — | — | — | — | — | — |
| Vulcanization accelerator (1) | 1.8 | 1.8 | 2.2 | 0.5 | 1.8 | 1.8 | 1.8 |
| Vulcanization accelerator (2) | 5.0 | 3.7 | 3.7 | 3.7 | 3.7 | 3.7 | 3.7 |
| CTP | 0.6 | 0.6 | 0.6 | 0.6 | 0.6 | 0.6 | 0.6 |
| Evaluation Results | | | | | | | |
| Scorch time (minute) | 5.4 | 9.2 | 8.0 | 8.2 | 9.0 | 8.2 | 6.5 |
| Viscoelasticity test | | | | | | | |
| E* (MPa) | 42 | 44 | 50 | 32 | 32 | 33 | 58 |
| tan δ | 0.14 | 0.15 | 0.15 | 0.14 | 0.12 | 0.112 | 0.101 |
| Steering stability | | | | | | | |
| Tire for SUV | 5 | 5 | 5+ | 3 | 3 | 3 | 6 |
| Tire for passenger car | 5 | 4+ | 5 | 4 | 4 | 4 | 5+ |
| Rate of change in rolling resistance (%) | ±0 | ±0 | +0.5 | +0.4 | −1.2 | −1.7 | −2.4 |
| Indoor load durability index | 100 | 95 | 95 | 105 | 120 | 125 | 80 |

INDUSTRIAL APPLICABILITY

The present invention can provide a rubber composition for a bead apex which can enhance extrusion processability by optimizing a rate of vulcanization during a vulcanization process, and improve rigidity, steering stability and a low fuel consumption property by compounding specified amounts of a diene rubber, a phenol resin and/or a modified phenol resin, sulfur, a specific vulcanization accelerator, and a specific vulcanization acceleration auxiliary. The present invention can also provide a tire having a bead apex prepared by using the rubber composition for a bead apex and being capable of enhancing steering stability and reducing rolling resistance and a tire for a sports utility vehicle (SUV) having further enhanced durability.

The invention claimed is:

1. A bead apex composed of a rubber composition for a bead apex, said rubber composition comprising:

5 to 25 parts by weight of a phenol resin and/or a modified phenol resin;

5.25 to 6.5 parts by weight of sulfur;

1.0 to 2.5 parts by weight of hexamethylenetetramine;

2.0 to 5.0 parts by weight of a benzothiazole vulcanization accelerator which may contain a sulfenamide moiety; and 0.1 to 5 parts by weight of a condensate of alkyl phenol and sulfur chloride represented by the following chemical formula:

wherein n is 0 or an integer of 1 to 10, X is an integer of 2 to 4, and R is an alkyl group having 8 carbon atoms, and 100 parts by weight of a diene rubber that is at least one member selected from the group consisting of natural rubbers, isoprene rubbers, butadiene rubbers, styrene-butadiene rubbers, and mixtures thereof, wherein the rubber composition has a Mooney scorch time of not less than 7.0 minutes and not more than 30 minutes.

2. The bead apex of claim 1, wherein the total amount of hexamethylenetetramine and benzothiazole vulcanization accelerator which may contain a sulfenamide moiety is 3.5 to 7.5 parts by weight based on 100 parts by weight of the diene rubber.

3. The bead apex of claim 1, wherein said diene rubber is a natural rubber.

4. The bead apex of claim 1, wherein the amount of condensate of alkyl phenol and sulfur chloride is 0.5 to 3.0 parts by weight based on 100 parts by weight of the diene rubber.

5. A tire having the bead apex of claim 1.

6. A tire for a sports utility vehicle having the bead apex of claim 1.

7. A tire having the bead apex of claim 2.

8. A tire having the bead apex of claim 3.

9. A tire having the bead apex of claim 4.

* * * * *